(12) United States Patent
Singh et al.

(10) Patent No.: US 8,274,380 B2
(45) Date of Patent: Sep. 25, 2012

(54) ANTICIPATORY RESPONSES TO COMMANDS

(75) Inventors: Ravi Singh, Mississauga (CA); Michael K. Brown, Kitchener (CA); Dinah Lea Marie Davis, Waterloo (CA); Neil Patrick Adams, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 575 days.

(21) Appl. No.: 12/325,543

(22) Filed: Dec. 1, 2008

(65) Prior Publication Data

US 2010/0134274 A1    Jun. 3, 2010

(51) Int. Cl.
*G08B 1/08* (2006.01)

(52) U.S. Cl. ............ 340/539.11; 340/539.1; 340/506; 340/10.4; 235/436; 235/439; 235/487; 235/492

(58) Field of Classification Search ............ 340/539.11, 340/539.1, 506, 10.4; 235/436, 439, 487, 235/492
See application file for complete search history.

(56) References Cited

U.S. PATENT DOCUMENTS

| | | | |
|---|---|---|---|
| 7,734,724 B2 * | 6/2010 | Rezvani et al. ............ | 709/219 |
| 2004/0162948 A1 | 8/2004 | Tremblay et al. | |
| 2008/0005261 A1 | 1/2008 | Adams et al. | |
| 2009/0014519 A1 | 1/2009 | Singh et al. | |

FOREIGN PATENT DOCUMENTS

| | | |
|---|---|---|
| CA | 2548042 | 11/2007 |
| CA | 2593592 | 1/2009 |
| WO | 03039092 | 5/2003 |

OTHER PUBLICATIONS

Joseph D Touch, Parallel Communication, Infocomm, Mar. 28-Apr. 1, 1993, USC Informational Sciences Institute, San Francisco, CA, USA.

Lelait, Sylvain, Examination Report for EP 08170375.3, Dec. 2, 2010.

Letait, Sylvain, Extended European Search Report for EP08170375. 3, Jun. 15, 2009.

* cited by examiner

*Primary Examiner* — Daryl Pope
(74) *Attorney, Agent, or Firm* — Integral Intellectual Property Inc.; Miriam Paton

(57) ABSTRACT

Responsive to intercepting an outbound command, a command interceptor may, upon determining that the command is associated with a particular category of commands, transmit an anticipatory response to the source of the command, for example, to prematurely indicate that the command has met with success. Accordingly, a given application whose further execution is dependent upon the successful completion of the command may further execute earlier than would be the case if the given application was to await the transmission of the command, the generation of a response indicating success and the receipt of the response indicating success.

53 Claims, 8 Drawing Sheets

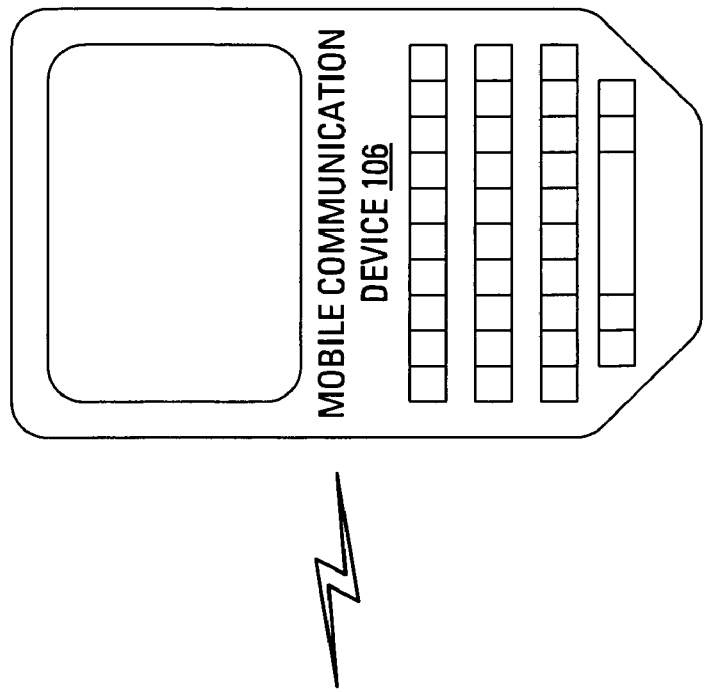
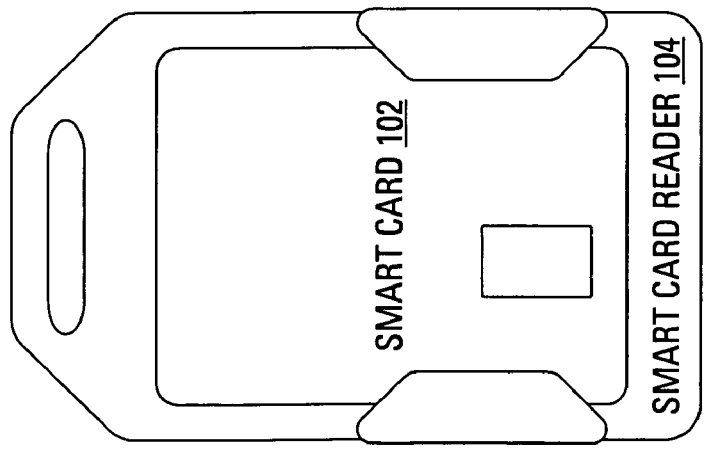
FIG. 1

ANTICIPATORY RESPONSES TO COMMANDS

FIELD

The present application relates generally to communication between a device and a component and, more specifically, to optimizing the communication through use of anticipatory responses to commands.

BACKGROUND

A device that reads information from, or writes information to, a smart card typically does so through the use of a smart card reader. The smart card reader may be connected, e.g., through a directly wired connection or a wireless connection, to the device. Specific software, called a "driver", is generally executed by the device to facilitate reading from, and writing to, a memory component of the smart card using the smart card reader. The driver includes an application programming interface (API) that allows other programs to issue requests and commands so that the requests and commands will be understood by the driver. An API generally comprises a source code interface that a computer system or program library provides in order to support requests for services to be made of the API by a computer program.

BRIEF DESCRIPTION OF THE DRAWINGS

Reference will now be made to the drawings, which show by way of example, embodiments, and in which:

FIG. 1 illustrates an environment in which a smart card is illustrated along with a mobile communication device that communicates wirelessly with a smart card reader;

DETAILED DESCRIPTION OF THE EMBODIMENTS

Figure 2:
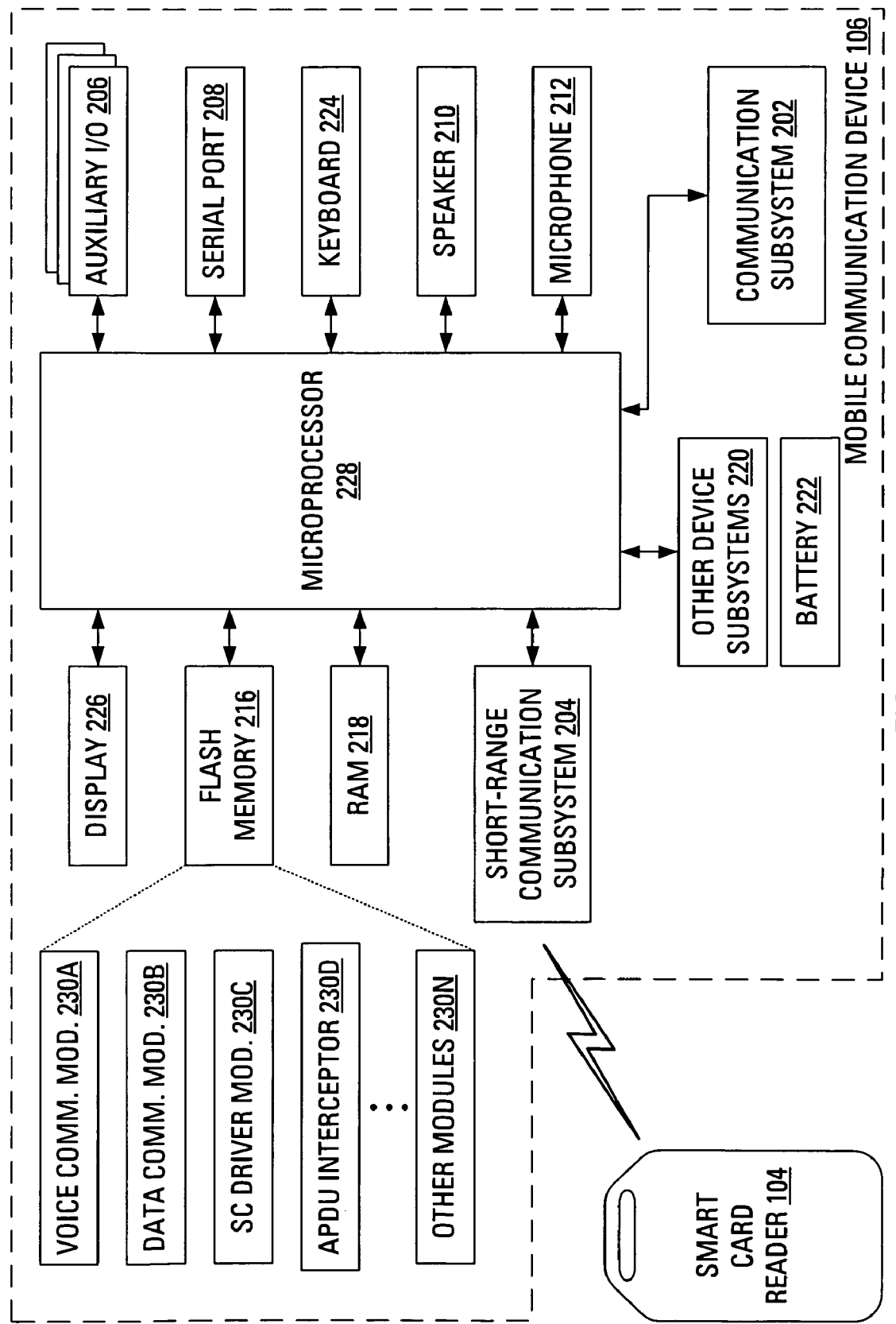
FIG. 2 schematically illustrates the mobile communication device of FIG. 1.

When the connection between the device and the smart card reader is wireless, for example, using the Bluetooth™ wireless communication protocol, some complications may arise. In a typical transaction, the device transmits, over the wireless connection, a request to the smart card reader and the smart card reader forwards the request to the smart card. The smart card then responds to the request with a response and the smart card reader forwards the response, over the wireless connection, to the device. Unfortunately, the latency of a round trip communication from the device to the smart card and back again limits the speed with which the device can make use of the smart card, e.g., to authenticate a user of the device. To a lesser extent, bandwidth available for the connection between device and smart card reader may also limit the speed with which the device can make use of the smart card. The smart card driver is located on the device and has knowledge of how to talk to the smart card, which has been received by the smart card reader. There are many cases where, in order to perform an operation, there is a requirement for several transactions.

Responsive to intercepting an outbound command, such as an APDU, a command interceptor may transmit an anticipatory response to the source of the command, for example, to prematurely indicate that the command has met with success. Accordingly, a given application whose further execution is dependent upon the successful completion of the command may further execute earlier than would be the case if the given application was to await the transmission of the command, the generation of a response indicating success and the receipt of the response indicating success.

In accordance with an aspect of the present application there is provided a method of handling outbound commands. The method includes intercepting a command outbound from a driver module and determining that the command will elicit a response selected from among a plurality of predictable responses. The method further includes selecting an anticipatory response from the plurality of predictable responses and transmitting the anticipatory response to the driver module. In other aspects of the present application, a mobile communication device is provided for carrying out this method and a computer readable medium is provided for adapting a processor to carry out this method.

In accordance with another aspect of the present application there is provided a method of handling a response. The method includes receiving a response from a smart card reader coupled to a smart card, determining that the response is of a type distinct from a type of response transmitted to an associated driver module as an anticipatory response to the command and storing, in a record, an indication that an incorrect anticipatory response has been transmitted to the associated driver module. In other aspects of the present application, a mobile communication device is provided for carrying out this method and a computer readable medium is provided for adapting a processor to carry out this method.

Other aspects and features of the present application will become apparent to those of ordinary skill in the art upon review of the following description of specific embodiments of the application in conjunction with the accompanying figures.

FIG. 1 illustrates an exemplary communication system 100 that includes a mobile communication device 106 that is enabled to communicate wirelessly with a peripheral device in the form of a smart card reader 104. A smart card 102 is illustrated mounted in the smart card reader 104. In some embodiments, the smart card 102 may be communicably coupled with the smart card reader 104 via a wireless link. In still further embodiments, the smart card reader 104 may be integrated with the mobile communication device 106, in which case, the smart card reader 104 may be called a component rather than a peripheral.

FIG. 2 illustrates the mobile communication device 106 including a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile communication device 106, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile communication device 106 are shown schematically in FIG. 2. These may include a communications subsystem 202, a short-range communications subsystem 204, the keyboard 224 and the display 226. The mobile communication device 106 may further include other input/output devices such as a set of auxiliary I/O devices 206, a serial port 208, a speaker 210 and a microphone 212. The mobile communication device 106 may further include memory devices including a flash memory 216 and a Random Access Memory (RAM) 218. Furthermore, the mobile communication device 106 may include various other device subsystems 220. The mobile communication device 106 may have a battery 222 to power the active elements of the mobile communication device 106. The mobile communication device 106 may, for instance, comprise a two-way radio frequency (RF) communication device having voice and data communication capabilities. In addition, the mobile communication device 106 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 106. A predetermined set of software applications that control basic device operations, such as a voice communications module 230A and a data communications module 230B, may be installed on the mobile communication device 106 during manufacture. A smart card (SC) driver module 230C may also be installed on the mobile communication device 106 during manufacture. Furthermore, a command APDU interceptor 230D may also be installed on the mobile communication device 106 to implement aspects of the present disclosure. As well, additional software modules, illustrated as other software modules 230N, which may comprise, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via a wireless carrier network. The data items managed by the PIM application may be seamlessly integrated, synchronized and updated via the wireless carrier network with the device user's corresponding data items stored or associated with a host computer system.

Communication functions, including data and voice communications, may be performed through the communication subsystem 202 and through the short-range communications subsystem 204.

The short-range communications subsystem 204 enables communication between the mobile communication device 106 and other proximate systems or devices, which need not necessarily be similar devices. For example, the short-range communications subsystem 204 may include a Bluetooth™ communication module to provide for communication with the smart card reader 104 where the smart card reader also implements a Bluetooth™ communication module. As another example, the short-range communications subsystem 204 may include an infrared device to provide for communication with similarly-enabled systems and devices.

Figure 3:
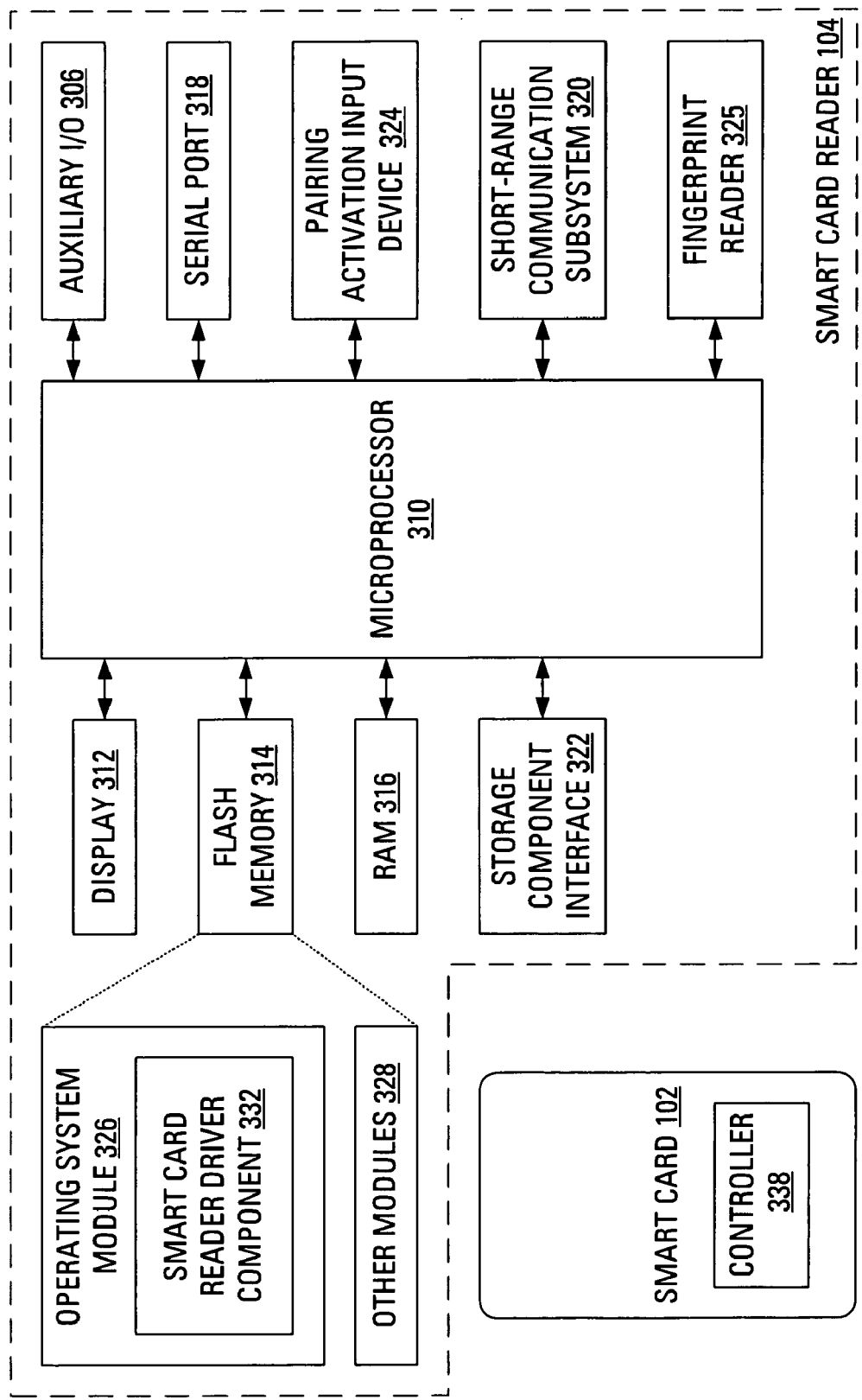
FIG. 3 schematically illustrates the smart card reader of FIG. 1.

FIG. 3 illustrates an example embodiment of the smart card reader 104. The smart card reader 104 includes a controller including at least one smart card reader microprocessor 310, which is suitably programmed to control the overall operation and functions of the smart card reader 104. The smart card reader 104 may also include an output device (e.g., a display module 312). The smart card reader 104 may further include peripheral devices or subsystems such as a flash memory 314, a RAM 316, a serial port 318 (e.g., a Universal Serial Bus, or "USB", port), a smart card reader short-range communications subsystem 320 (e.g., an infrared transceiver, wireless bus protocol system using a protocol such as a Bluetooth™), a storage component interface 322 (e.g., for a memory card or any other data storage device), a pairing-activation input device 324 (e.g., a push button) and a biometric information input device 325 (e.g., a fingerprint sensor). In some embodiments, the RAM 316 includes a portion allocated to a data cache.

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software application modules indicated generally by reference 328. The operating system module 326 of the smart card reader 104 further includes a smart card reader driver component 332.

The smart card reader driver component 332 is responsible for coordinating communications between the smart card reader 104 and the smart card 102 and/or the smart card driver module 230C of the mobile communication device 106. Based on results of various communications with the smart card reader 104, the smart card driver module 230C maintains a record of the state of the smart card 102. The operating system module code 326, code for specific device application modules 328, code for the smart card reader driver component 332, or code components thereof, may be temporarily loaded into a volatile storage medium such as the RAM 316. Received communication signals and other data may also be stored in the RAM 316. Additionally, the storage component interface 322 receives the smart card 102, which may provide additional storage space for the smart card reader 104.

In one embodiment, the smart card 102 has a controller 338 responsible for coordinating communications between the smart card 102 and the smart card reader driver component 332 of the smart card reader 104.

The stored program control (i.e., software application modules 328) for the smart card reader microprocessor 310 may include a predetermined set of applications, code components or software modules that control basic device operations, for example, management and security related control of the data of the smart card reader 104, and may be installed on the smart card reader 104 as a component of the software application modules 328 during the manufacturing process. Further applications may also be loaded (i.e., downloaded) onto the smart card reader 104 through the operation of the serial port 318, the smart card reader short-range communications subsystem 320 or from the smart card 102. The downloaded code modules or components may then be installed by the user (or automatically) in the RAM 316 or non-volatile program memory (e.g., the flash memory 314).

While the smart card reader driver component 332 is shown to be an integrated portion of the operating system 326 for security purposes (e.g., individuals are not permitted to tamper with the smart card reader driver component 332), the smart card reader driver component 332 may be installed as one of the software applications 328, and in such embodiments, suitable security related precautions may be taken to ensure that the smart card reader driver component 332 cannot be modified or tampered with by unauthorized users.

The serial port 318 may be a USB-type interface port for interfacing or synchronizing with another device, such as a personal computer or the mobile communication device 106. The serial port 318 is used to set preferences through an external device or software application or exchange data with a device, such as the mobile communication device 106. Such data may be stored on the smart card 120 that is plugged into the storage component interface 322 of the smart card reader 104. The serial port 318 is also used to extend the capabilities of the smart card reader 104 by providing for downloads, to the smart card reader 104, of information or software, including user interface information.

The short-range communications subsystem 320 provides an interface for communication between the mobile communication device 106 or personal computer and the smart card reader 104. In one embodiment, the short-range communications subsystem 320 employs an infrared communication link or channel. In another embodiment, the short-range communications subsystem 320 operates according to a wireless RF bus protocol, such as Bluetooth™. However, the short-range communications subsystem 320 may operate according to any suitable local wired or wireless communication protocol, so long as the short-range communications subsystem 204 (FIG. 2) of the mobile communication device 106 operates using the same protocol, thereby facilitating wireless communication between the mobile communication device 106 and the smart card reader 104. Any communications mechanism and/or protocol may be implemented for the short-range communications subsystems 204, 320, so long as the mobile communication device 106 can communicate with the smart card reader 104 when the mobile communication device 106 is no more than a predetermined distance away from the smart card reader 104.

Traditionally, a smart card driver module is supplied by the manufacturer of the smart card 102. The operating system of the mobile communication device 106 includes an API. Aspects of the API define a smart card framework. The smart card driver module 230C registers with the operating system of the mobile communication device 106 so that calls to smart card framework aspects of the API can be appropriately handled by the smart card driver module 230C.

Communication between the smart card reader 104 and the smart card 102 may be standardized to use Application Protocol Data Units (APDUs), where a standard structure for an APDU is defined by ISO 7816. ISO 7816 is an international standard related to electronic identification cards, especially smart cards, managed jointly by the International Organization for Standardization (ISO) and the International Electrotechnical Commission (IEC). It may be considered that there are various categories of APDUs including command APDUs and response APDUs. A command APDU is sent by the smart card reader 104 to the smart card 102. A command APDU contains a header and may contain data. A response APDU is sent by the smart card 102 to the smart card reader 104. A response APDU contains a status word and may contain data.

When the given application executed on the microprocessor 228 of the mobile communication device 106 requires input from the smart card 102, the given application sends an initial request to the smart card framework, which request is redirected, by the smart card framework, to the smart card driver module 230C, which is also executed by the microprocessor 228. Responsive to receiving the request, the smart card driver module 230C issues a request command APDU to the smart card 102, via the smart card reader 104. Upon receiving the request command APDU from the smart card driver module 230C, the smart card reader 104 forwards the request command APDU to the smart card 102. Note that, in general, a request command APDU may be transmitted to the smart card 102 in bits and pieces, e.g., in a series of packets. Such piecewise transmission is provided for in protocols known as T=0 and T=1 as part of ISO 7816. The smart card 102 receives the request command APDU and responds by sending a response APDU to the smart card reader 104. The smart card reader 104, upon receiving the response APDU, forwards the response APDU to the smart card driver module 230C. Responsive to receiving the response APDU, the smart card driver module 230C generates a response and transmits the response to the given application.

It can be documented that wireless communication (sending and receiving each packet) between the smart card reader 104 and the mobile communication device 106 is associated with a greater amount of latency than wired communication of the same packets. As a result, operations on the mobile communication device 106, when the operations involve use of a wireless channel to the smart card reader 104, can, due to this latency, take significantly longer than when the operations involve use of a wired channel to the smart card reader 104. It is, therefore, desirable to reduce, to a practical extent, the latency associated with the exchange of packets between the mobile communication device 106 and the smart card reader 104.

It has been discussed that the smart card reader driver module 230C on the mobile communication device 106 generates command APDUs. While there are many possible command APDUs, the command APDUs may be divided into command APDUs that have a predictable set of possible response APDUs and all other command APDUs (i.e., those command APDUs whose set of possible response APDUs do not form a predictable set).

For example, a command APDU such as the "SELECT FILE" command APDU may be considered to be in the category of command APDUs that have a predictable set of possible response APDUs. The "SELECT FILE" command APDU usually elicits a response APDU indicating success or a response APDU indicating failure. In contrast, a command APDU requesting encryption of some data will elicit a response carrying a payload that depends on, inter alia, the data that is to be encrypted, the key used for encryption and the method of encryption.

For a more exhaustive study of indications that may be found in a response APDU that the smart card 102 transmits in response to the "SELECT FILE" command APDU, see part 4 of ISO 7816 and, in particular, Section 6: Basic Interindustry Commands. The status condition indicated in a response APDU (responsive to the SELECT FILE command APDU) may be ascertained by reviewing status bytes SW1 and SW2. For example, a response APDU that indicates successful implementation of a received command APDU may have the following values in the status bytes: SW1=0x90; and SW2=0x00.

A response APDU (responsive to the SELECT FILE command APDU) that indicates a warning regarding implementation of a received command APDU may have the following values in the status bytes: SW1=0x62; and SW2=0x83 (selected file invalidated) or SW2=0x84 (not formatted properly).

A response APDU (responsive to the SELECT FILE command APDU) that indicates an error (i.e., a failure) in implementing a received command APDU may have the following values in the status bytes: SW1=0x6A; and SW2=0x81 (Function not supported); or SW2=0x82 (File not found); or SW2=0x86 (Incorrect parameters P1-P2); or SW2=0x87 (Lc inconsistent with P1-P2).

By bypassing a wait for a number of packets to be exchanged over a wireless channel between the mobile communication device 106 and the smart card reader 104, the latency of operations that use the wireless channel can be reduced.

In overview, by intercepting command APDUs outbound from the smart card reader driver 230C and categorizing the command APDUs, the command APDU interceptor 230D may identify a specific type of command APDU that elicits a predictable response APDU. By generating the predictable response APDU and transmitting the predictable response APDU to the smart card reader driver 230C, command APDU interceptor 230D may reduce the latency of operations that use the wireless channel.

Figure 4:
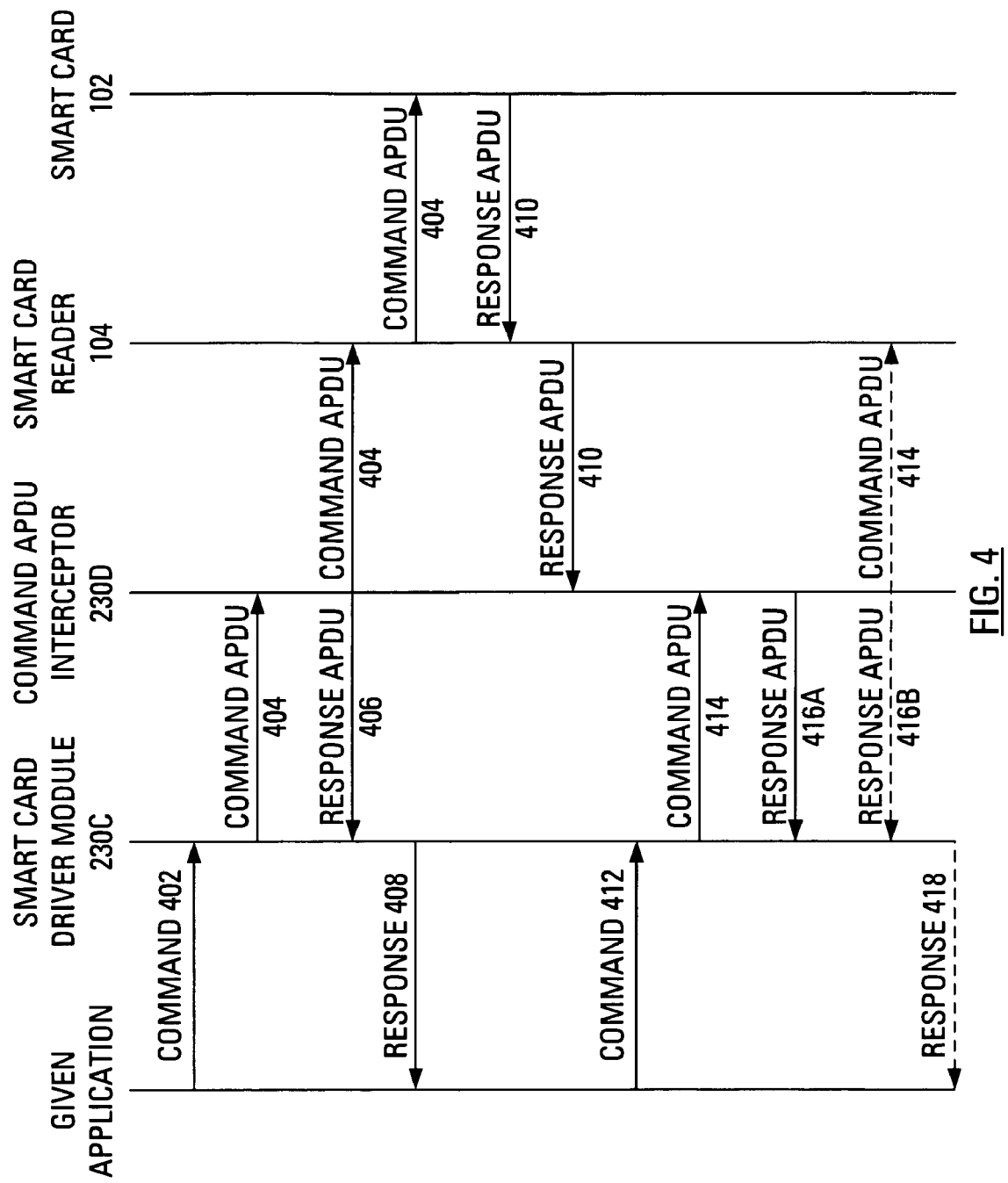
FIG. 4 illustrates a representation of interaction between a smart card driver module and a command interceptor of the mobile communication device of FIG. 2, the smart card reader of FIG. 3 and the smart card of FIG. 1.

In view of FIG. 4, the command APDU interceptor 230D may intercept (step 502) a command APDU 404 generated by the smart card driver module 230C, before the smart card driver module 230C is able to transmit the command APDU 404 over the wireless connection to the smart card reader 104. Notably, the smart card driver module 230C may have generated the command APDU 404 responsive to receiving a command 402 from a given application.

Intercepting the command APDU 404 may involve delaying transmission of the command APDU 404 to the smart card reader 104 while providing the smart card driver module 230C with an indication that the command APDU 404 has been transmitted.

Alternatively, intercepting the command APDU 404 may involve merely "listening in" as the smart card driver module 230C transmits the command APDU 404 to the smart card reader 104, such that the command APDU interceptor 230D obtains a copy of the command APDU 404.

The command APDU interceptor 230D may then categorize (step 504) the intercepted command APDU 404, that is, the command APDU interceptor 230D may associate the intercepted command APDU 404 with a category. One example category with which the intercepted command APDU 404 may be associated is a category of command APDUs that elicit, from the destination smart card, a response APDU selected from among a predictable set of possible response APDUs. One example category with which the intercepted command APDU 404 may be associated is a category of command APDUs that elicit, from the destination smart card, a response APDU that does not come from a predictable set of possible response APDUs.

In the case wherein the command APDU interceptor 230D determines (step 506) that the intercepted command APDU 404 is categorized as a command APDU whose response APDU does not come from a predictable set of possible response APDUs, the command APDU interceptor 230D may transmit (step 508), without further processing, the command APDU 404 over the wireless connection to the smart card reader 104.

In the case wherein the command APDU interceptor 230D determines (step 506) that the command APDU 404 has been categorized (step 504) as a command APDU that elicits a response APDU selected from a predictable set of possible response APDUs, the command APDU interceptor 230D may select (step 510) an anticipatory response APDU 406 from among the predictable set of possible response APDUs. For example, where the predictable set of possible response APDUs includes a response APDU that indicates success, the command APDU interceptor 230D may select, as the anticipatory response APDU 406, the response APDU that indicates success. The command APDU interceptor 230D may then transmit (step 512), to the smart card driver module 230C, the anticipatory response APDU 406. Additionally, the command APDU interceptor 230D may transmit (step 508) the command APDU 404 to the smart card reader 104 over the wireless connection.

The transmission (step 508), by the command APDU interceptor 230D, of the command APDU 404 over the wireless connection to the smart card reader 104 may only be necessary in the event that the interception (step 502) of the command APDU 404 has involved delaying the transmission of the command APDU 404 over the wireless connection to the smart card reader 104.

Thus, the smart card driver module 230C may be given an indication (by the anticipatory response APDU 406) that the command carried in the payload of the command APDU 404 has been carried out successfully by the smart card 102, thereby allowing the smart card 102 to transmit a response APDU indicating success. Responsive to receiving the anticipatory response APDU 406, the smart card driver module 230C generates a response 408 and transmits the response 408 to the given application.

Responsive to receiving the command APDU 404, the smart card reader 104 passes the command APDU 404 to the smart card 102, at which the command APDU 404 is processed. Following the processing of the command APDU 404, the smart card 102 passes a response APDU 410 to the smart card reader 104. The smart card reader 104 then transmits the response APDU 410, over the wireless connection, to the mobile communication device 106.

Figure 6:
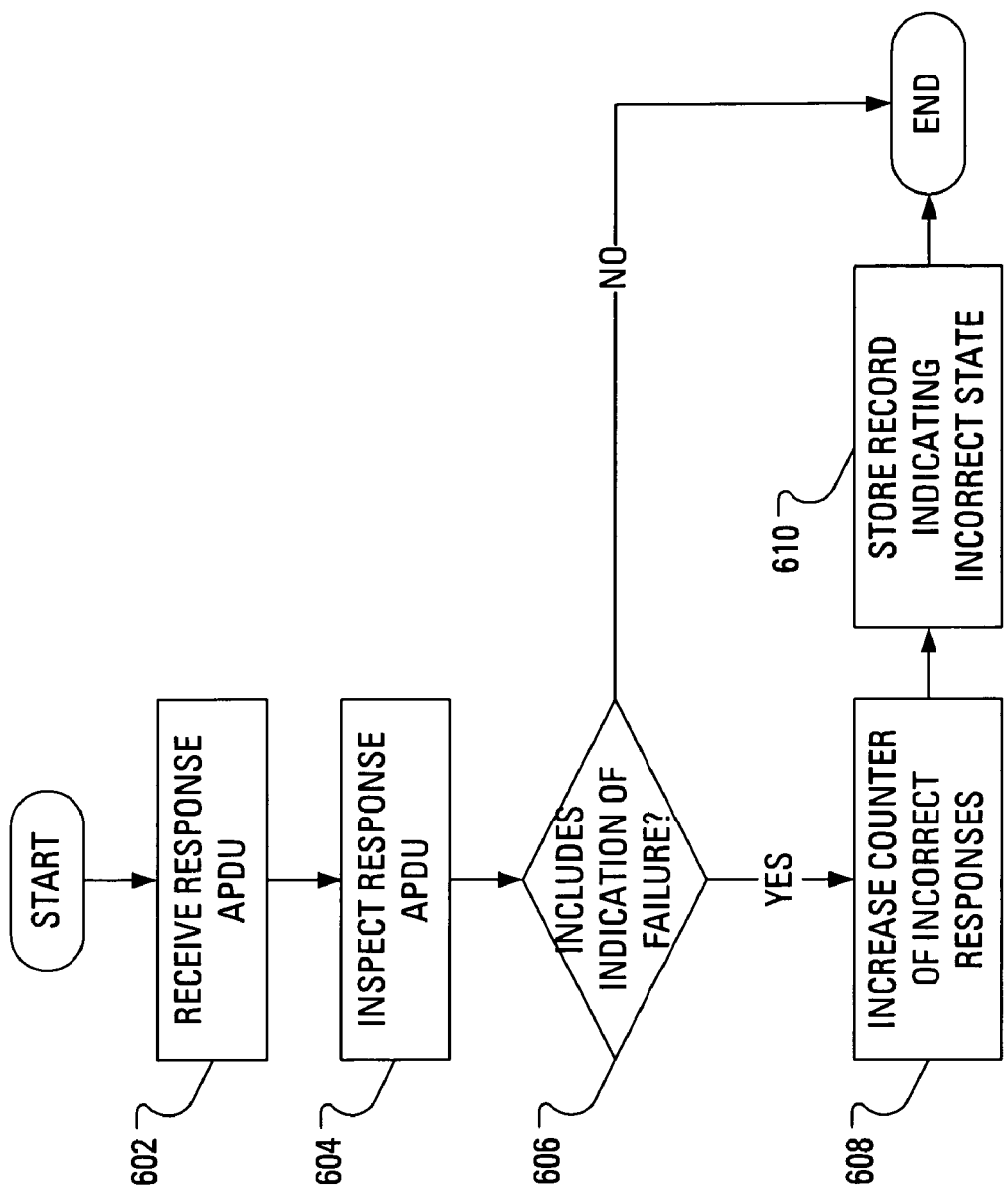
FIG. 6 illustrates steps in an exemplary method of handling a response Application Protocol Data Unit (APDU) at the command interceptor of the mobile communication device of FIG. 1.

FIG. 6 illustrates steps in an exemplary method of handling the response APDU 410 at the command APDU interceptor 230D of the mobile communication device 106. Initially, the command APDU interceptor 230D receives (step 602) the response APDU 410. In the case wherein, upon inspecting (step 604) the response APDU 410, the command APDU interceptor 230D determines (step 606) that the response APDU 410 includes an indication of success, the command APDU interceptor 230D need not carry out any further steps relative to this exchange of APDUS, since the command APDU interceptor 230D has already transmitted (step 512)

the anticipatory response APDU 406 indicating success to the smart card driver module 230C. Conveniently, before sending the response 408, the smart card driver module 230C did not wait for the command APDU 404 to be sent, over the wireless connection, to the smart card reader 104; the processing of the command APDU 404 by the smart card 102, leading to the generation, by the smart card 102, of the response APDU 410; and the receipt of the response APDU 410, over the wireless connection.

In the case wherein, upon inspecting (step 604) the response APDU 410, the command APDU interceptor 230D determines (step 606) that the response APDU 410 includes an indication of failure, the command APDU interceptor 230D stores (step 610) a record that indicates that the smart card driver module 230C has received an incorrect anticipatory response. Based on storage of the record that indicates that the smart card driver module 230C has received an incorrect anticipatory response, the command APDU interceptor 230D may be considered to store an indication that that the smart card driver module 230C is likely to be maintaining incorrect information about the state of the smart card 102. Optionally, ahead of storing (step 610) the record, the command APDU interceptor 230D may increase (step 608) a counter of incorrect responses.

Figure 7:
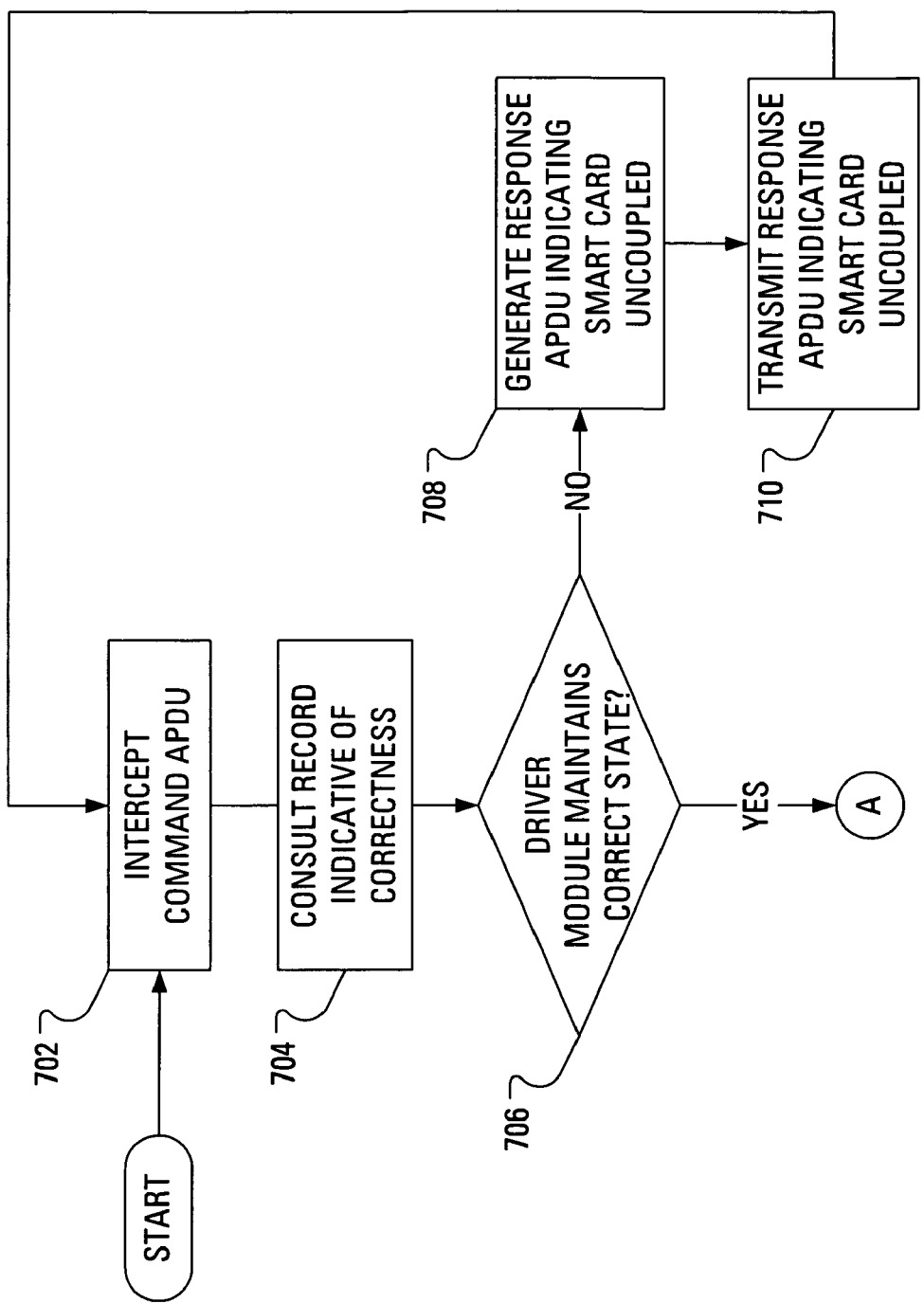
FIG. 7 illustrates steps of an exemplary method of handling a case wherein the smart card driver module of the mobile communication device of FIG. 1 has received incorrect information about the state of the smart card of FIG. 1.

FIG. 7 illustrates steps of an exemplary method of handling the case wherein the smart card driver module 230C has received an incorrect anticipatory response. Upon receiving (step 702) a subsequent command APDU 414 from the smart card driver module 230C, the command APDU interceptor 230D consults (step 704) the record that indicates whether the smart card driver module 230C has received an incorrect anticipatory response. The subsequent command APDU 414 may have been generated by the smart card driver module 230C responsive to having received a subsequent command 412 from the given application.

In a first scenario, upon determining (step 706) that the smart card driver module 230C is likely to be maintaining an incorrect state of the smart card 102, the command APDU interceptor 230D generates (step 708) a "smart-card-removed" response APDU 416A that indicates that the smart card 102 has been removed from the smart card reader 104. In the case wherein the smart card 102 and the smart card reader 104 communicate wirelessly rather than via a physical connection, a "smart-card-removed" response may be used to indicate that the smart card 102 and the smart card reader 104 have become uncoupled. Subsequently, the command APDU interceptor 230D transmits (step 710), to the smart card driver module 230C, the "smart-card-removed" response APDU 416A.

Responsive to receiving the "smart-card-removed" response APDU 416A, the smart card driver module 230C resets the record of the state of the smart card 102. Once the smart card driver module 230C has reset the record of the state of the smart card 102, the smart card driver module 230C may issue a further command APDU (not shown), where the further command APDU is very similar to the subsequent command APDU 414, but is based on a different assumption of the state of the smart card 102.

Figure 5:
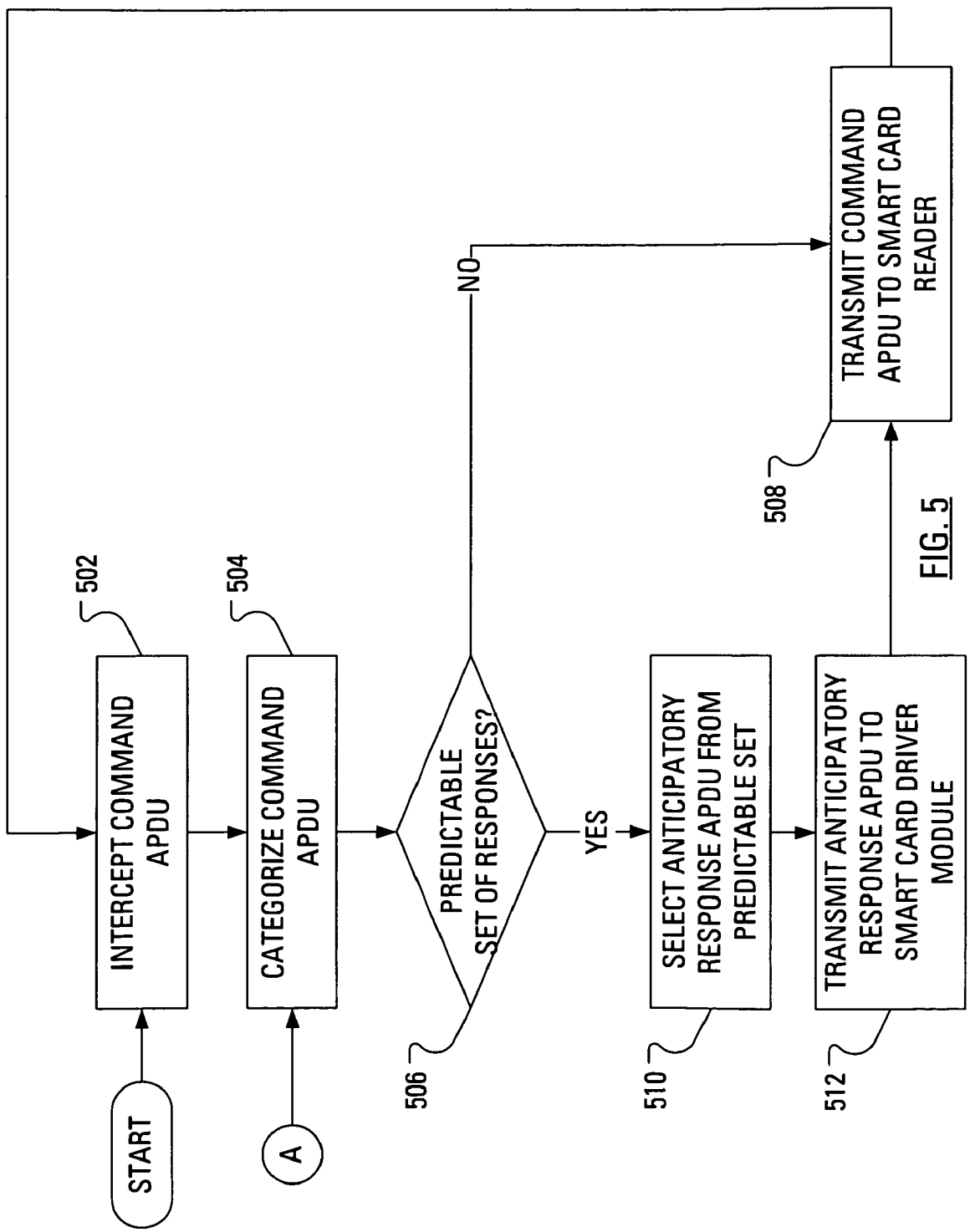
FIG. 5 illustrates steps in an exemplary method performed by the command interceptor of the mobile communication device of FIG. 2.

In a second scenario, upon determining (step 706) that the smart card driver module 230C is likely to be maintaining a correct state of the smart card 102, the command APDU interceptor 230D proceeds to execute the method of FIG. 5. That is, the command APDU interceptor 230D categorizes (step 504) the subsequent command APDU 414 as either a command APDU with a predictable set of possible response APDUs or a command APDU whose set of possible response APDUs do not form a predictable set of possible response APDUs. In the case wherein the command APDU interceptor 230D determines (step 506) that the subsequent command APDU 414 has been categorized (in step 504) as a command APDU whose set of possible response APDUs do not form a predictable set of possible response APDUs, the command APDU interceptor 230D may transmit (step 508) the subsequent command APDU 414 over the wireless connection to the smart card reader 104.

However, in the case wherein the command APDU interceptor 230D determines (step 506) that the subsequent command APDU 414 has been categorized (in step 504) as a command APDU with a predictable set of possible response APDUs, the command APDU interceptor 230D may select (step 510) an anticipatory response APDU 416B from among the predictable set of possible response APDUs. The command APDU interceptor 230D may then transmit (step 512), to the smart card driver module 230C, the anticipatory response APDU 416B. Additionally, the command APDU interceptor 230D may transmit (step 508) the subsequent command APDU 414 to the smart card reader 104 over the wireless connection.

The smart card driver module 230C may be given an indication (by the anticipatory response APDU 416B) that the subsequent command APDU 414 has met with success. Responsive to receiving the anticipatory response APDU 416B, the smart card driver module 230C generates a response 418 and transmits the response 418 to the given application.

Accordingly, it is contemplated that the command APDU interceptor 230D may keep track of transmitted incorrect anticipatory responses (see step 608, FIG. 6). Based on a determined rate of transmission of incorrect anticipatory responses, the command APDU interceptor 230D may adjust a frequency with which intercepted command APDUs are considered as predictable candidates for anticipatory responses. For example, the command APDU interceptor 230D may consider every second intercepted command APDU, every third intercepted command APDU, . . . , every tenth intercepted command APDU, etc. A method in which an alterable frequency of consideration may be incorporated into the method of FIG. 5 is illustrated in FIG. 8.

Figure 8:
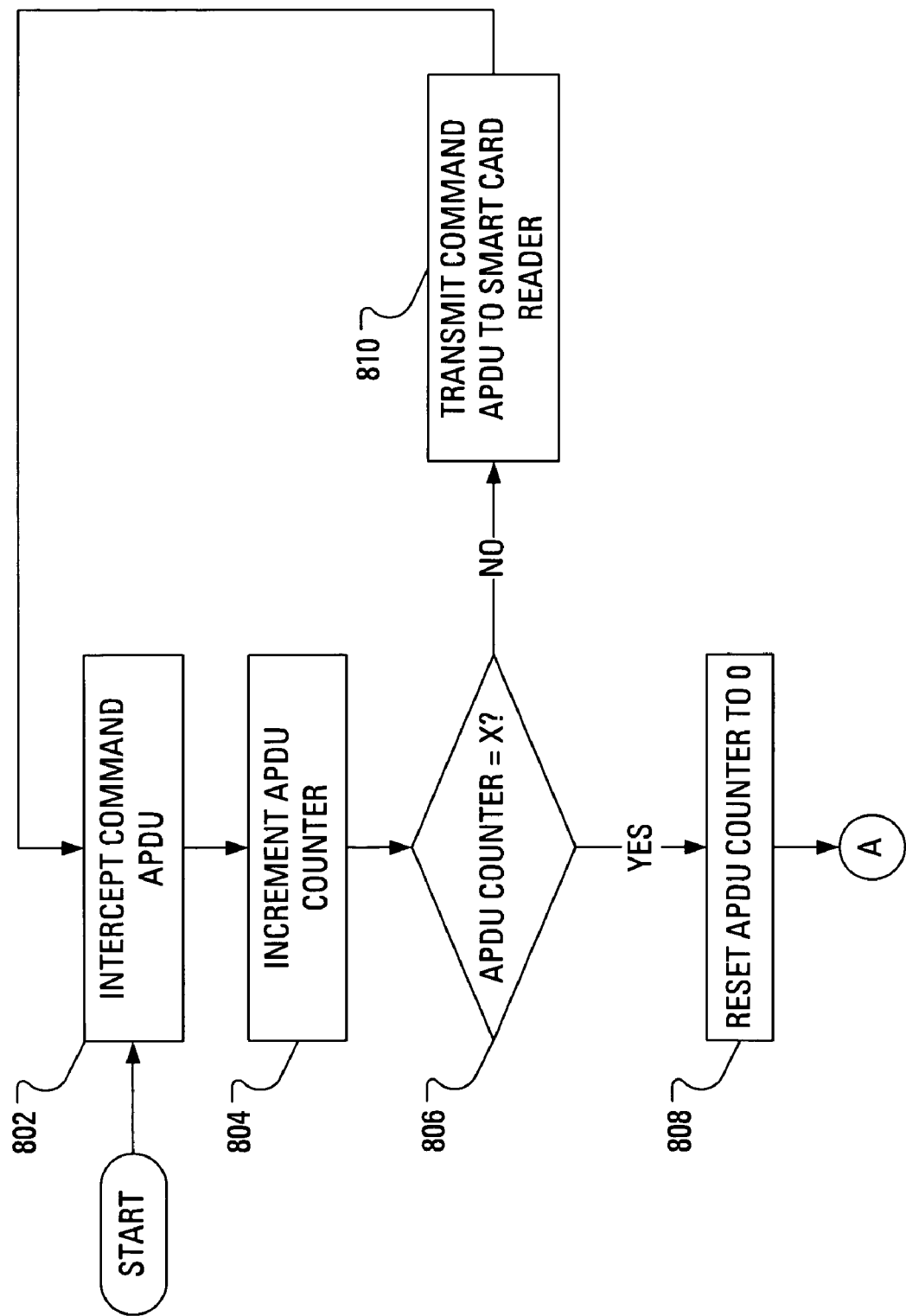
FIG. 8 illustrates steps of an exemplary method in which an alterable frequency of consideration may be incorporated into the method of FIG. 5.

The method illustrated in FIG. 8 begins when the command APDU interceptor 230D intercepts (step 802) a command APDU. Responsive to intercepting a command APDU, the command APDU interceptor 230D increments (step 804) an APDU counter. The command APDU interceptor 230D then determines (step 806) whether the APDU counter has reached a predetermined value, "X". Upon determining that the APDU counter has reached value X, the command APDU interceptor 230D resets (step 808) the APDU counter to zero. Subsequent to resetting the APDU counter, the command APDU interceptor 230D proceeds to execute the method of FIG. 5. That is, the command APDU interceptor 230D categorizes (step 504) the command APDU intercepted in step 802 as either a command APDU with a predictable set of possible response APDUs or a command APDU whose set of possible response APDUs do not form a predictable set of possible response APDUs.

Upon determining (step 806) that the APDU counter has not yet reached value X, the command APDU interceptor 230D transmits (step 810) the command APDU intercepted in step 802 to the smart card reader 104. That is, the command APDU interceptor 230D does not interfere with the normal progression of the APDU exchange. Instead of examining every intercepted command APDU for eligibility for generating an anticipatory APDU, as perhaps suggested by the method of FIG. 5, every X intercepted command APDU is examined more closely for the opportunity of sending an anticipatory response APDU. Accordingly, the apparent latency of the APDU exchange is only reduced for every X intercepted command APDU.

The value of X may be initialized to a first value. However, as operation of the command APDU interceptor 230D is carried out, an aspect of the command APDU interceptor 230D may monitor the counter of incorrect anticipatory response APDUs (counted in step 608). Based on a determined rate of transmission of incorrect anticipatory response APDUs, the command APDU interceptor 230D may adjust a frequency with which intercepted command APDUs are considered as candidates for anticipatory responses. The rate of transmission of incorrect anticipatory response APDUs may be determined from a count of total intercepted command APDUs and the count held at a given time in the counter of incorrect anticipatory response APDUs (counted in step 608).

If a frequency exceeds a predetermined maximum, the command APDU interceptor 230D may adjust the value of X so that relatively fewer intercepted command APDUs are considered as candidates for the anticipator response APDU.

Advantageously, according to various embodiments of the present application, while the volume of traffic between the mobile communication device 106 and the smart card reader 104 remains unchanged, the delay between the given application sending an initial command 402 and receiving the response 408 (based on the anticipatory response APDU 406) may frequently be reduced.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of handling outbound commands, said method comprising:
   intercepting a command outbound from a driver module;
   determining that said command will elicit a response selected from among a plurality of predictable responses;
   selecting an anticipatory response from said plurality of predictable responses; and
   transmitting said anticipatory response to said driver module.

2. The method of claim 1 wherein said intercepting comprises delaying transmission of said command to a smart card reader over a wireless communication channel.

3. The method of claim 1 further comprising transmitting said command to a smart card reader over a wireless communication channel.

4. The method of claim 3 wherein said wireless communication channel comprises a Bluetooth communication channel.

5. The method of claim 1 wherein said intercepting comprises obtaining a copy of said command and transmitting said command to a smart card reader over a wireless communication channel.

6. The method of claim 1 wherein said plurality of predictable responses includes a first predictable response that indicates success.

7. The method of claim 6 wherein said selecting said anticipatory response comprises selecting said first predictable response that indicates success.

8. The method of claim 1, where said command is a first command, and said method further comprises:
   intercepting a second command outbound from said driver module;
   determining that said driver module is maintaining an incorrect state of a smart card to which said second command is addressed;
   generating a further response, said further response indicating that said smart card has been uncoupled from an associated smart card reader; and
   transmitting said further response to said driver module.

9. The method of claim 8 wherein said determining that said driver module is maintaining said incorrect state comprises consulting a record of smart card state information.

10. The method of claim 1 further comprising, responsive to receiving said command, incrementing a counter of commands.

11. The method of claim 10 further comprising only executing said associating, determining, selecting and transmitting when a value maintained in said counter of commands is greater than or equal to a predetermined value.

12. The method of claim 1 wherein said command is a command Application Protocol Data Unit (APDU) and said response is a response APDU.

13. The method of claim 1 further comprising, responsive to said intercepting, associating said command with a category, selected from among a plurality of categories, to facilitate said determining.

14. The method of claim 13 wherein said plurality of categories includes a category of commands with a predictable set of possible responses.

15. The method of claim 13 wherein said plurality of categories includes a category of commands whose set of possible responses do not form a predictable set of possible responses.

16. A mobile communication device comprising:
   a processor adapted to execute a component to:
      intercept a command outbound from a driver module;
      determine that said command will elicit a response selected from among a plurality of predictable responses;
      select an anticipatory response from said plurality of predictable responses; and
      transmit said anticipatory response to said driver module.

17. The mobile communication device of claim 16 further comprising a short range communication subsystem adapted to transmit said command to a smart card reader over a wireless communication channel.

18. The mobile communication device of claim 17 wherein said wireless communication channel comprises a Bluetooth communication channel.

19. The mobile communication device of claim 16 further comprising a counter of commands, wherein said processor is further adapted to execute said component to increment said counter of commands responsive to receiving said command.

20. The mobile communication device of claim 18 wherein said processor is further adapted to only execute said component to associate, determine, select and transmit when a value maintained in said counter of commands is greater than or equal to a predetermined value.

21. The mobile communication device of claim 16 wherein said command is a command Application Protocol Data Unit (APDU) and said response is a response APDU.

22. A non-transitory computer-readable medium containing computer-executable instructions that, when performed by a processor in a mobile communication device, cause said processor to:
   intercept a command outbound from a driver module;

determine that said command will elicit a response selected from among a plurality of predictable responses;
select an anticipatory response from said plurality of predictable responses; and
transmit said anticipatory response to said driver module.

23. The computer-readable medium of claim 22 wherein said instructions cause said processor to intercept by causing said processor to delay transmission of said command.

24. The computer-readable medium of claim 23 wherein said instructions further cause said processor to transmit said command to a smart card reader over a wireless communication channel.

25. The computer-readable medium of claim 24 wherein said wireless communication channel comprises a Bluetooth communication channel.

26. The computer-readable medium of claim 22 wherein said instructions cause said processor to intercept by causing said processor to obtain a copy of said command as said command is transmitted.

27. The computer-readable medium of claim 22 wherein said plurality of predictable responses includes a response that indicates success.

28. The computer-readable medium of claim 22 wherein said instructions further cause said processor to:
intercept a command outbound from a driver module;
determine that said driver module is maintaining an incorrect state of a smart card to which said second command is addressed;
generate a further response, said further response indicating that said smart card has been uncoupled from an associated smart card reader; and
transmit said further response to said driver module.

29. The computer-readable medium of claim 28 wherein said determining that said driver module is maintaining said incorrect state comprises consulting a record of smart card state correctness.

30. The computer-readable medium of claim 22 wherein said instructions further cause said processor to increment a counter of commands responsive to receiving said command.

31. The computer-readable medium of claim 30 wherein said instructions further cause said processor to only execute said associating, determining, selecting and transmitting when a value maintained in said counter of commands is greater than or equal to a predetermined value.

32. The computer-readable medium of claim 22 wherein said command is a command Application Protocol Data Unit (APDU) and said response is a response APDU.

33. A method of handling a response, said method comprising:
receiving a response from a smart card reader coupled to a smart card, said response responsive to a command previously transmitted to said smart card reader;
determining that said response is of a type distinct from a type of response transmitted to an associated driver module as an anticipatory response to said command; and
storing, in a record, an indication that an incorrect anticipatory response has been transmitted to said associated driver module.

34. The method of claim 33 further comprising, responsive to said determining, incrementing a counter of incorrect anticipatory responses provided to said associated driver module.

35. The method of claim 33 further comprising receiving said response over a wireless communication channel.

36. The method of claim 35 wherein said wireless communication channel comprises a Bluetooth communication channel.

37. The method of claim 33 further comprising:
intercepting a command outbound from said driver module;
determining that said driver module is likely to be maintaining an incorrect state of said smart card;
generating a further response, said further response indicating that said smart card has been uncoupled from said smart card reader; and
transmitting said further response to said driver module.

38. The method of claim 37 wherein said determining that said driver module is likely to be maintaining said incorrect state comprises consulting said record.

39. The method of claim 33 wherein said command is a command Application Protocol Data Unit (APDU) and said response is a response APDU.

40. A mobile communication device comprising:
a memory;
a processor adapted to execute a component to:
receive a response from a smart card reader coupled to a smart card, said response responsive to a command previously transmitted to said smart card reader;
determining that said response is distinct from a response transmitted to an associated driver module as an anticipatory response to said command; and
storing, in a record in said memory, an indication that an incorrect anticipatory response has been transmitted to said associated driver module.

41. The mobile communication device of claim 40 further comprising a counter and wherein said processor is further adapted to execute said component to increment, responsive to said determining, said counter of incorrect responses provided to said associated driver module.

42. The mobile communication device of claim 40 further comprising a short-range communication subsystem adapted to receive said response over a wireless communication channel.

43. The mobile communication device of claim 42 wherein said wireless communication channel comprises a Bluetooth communication channel.

44. The mobile communication device of claim 40 wherein said processor is further adapted to execute said component to:
intercept a command outbound from said driver module;
determine that said driver module is maintaining an incorrect state of said smart card;
generate a further response, said further response indicating that said smart card has been uncoupled from said smart card reader; and
transmit said further response to said driver module.

45. The mobile communication device of claim 44 wherein said processor is further adapted to execute said component to determine that said driver module is maintaining said incorrect state by consulting said record.

46. The mobile communication device of claim 40 wherein said command is a command Application Protocol Data Unit (APDU) and said response is a response APDU.

47. A non-transitory computer-readable medium containing computer-executable instructions that, when performed by a processor in a mobile communication device, cause said processor to:
receive a response from a smart card reader in which is coupled to a smart card;
determining that said response includes an indication of failure; and storing, in a record, an indication that an associated driver module may be maintaining an incorrect state for said smart card.

48. The computer-readable medium of claim 47 wherein said instructions further cause said processor to increment, responsive to said determining, a counter of incorrect responses provided to said associated driver module.

49. The computer-readable medium of claim 47 wherein said instructions further cause said processor to receive said response over a wireless communication channel.

50. The computer-readable medium of claim 49 wherein said wireless communication channel comprises a Bluetooth communication channel.

51. The computer-readable medium of claim 47 wherein said instructions further cause said processor to:

intercept a command outbound from said driver module;
determine that said driver module is maintaining an incorrect state of said smart card;
generate a further response, said further response indicating that said smart card has been uncoupled from said smart card reader; and
transmit said further response to said driver module.

52. The computer-readable medium of claim 51 wherein said instructions further cause said processor to determine that said driver module is maintaining said incorrect state by consulting said record.

53. The computer-readable medium of claim 47 wherein said command is a command Application Protocol Data Unit (APDU) and said response is a response APDU.

* * * * *

UNITED STATES PATENT AND TRADEMARK OFFICE
CERTIFICATE OF CORRECTION

PATENT NO.        : 8,274,380 B2
APPLICATION NO.   : 12/325543
DATED             : September 25, 2012
INVENTOR(S)       : Ravi Singh et al.

Page 1 of 1

It is certified that error appears in the above-identified patent and that said Letters Patent is hereby corrected as shown below:

Col. 12, Lines 17-18, Lines 2-3 of claim 11 should recite "executing said determining, selecting and transmitting when a value maintained in said counter of commands"

Col. 12, Lines 56-57, Lines 2-3 of claim 20 should recite "said processor is further adapted to only execute said component to determine, select and transmit when a value"

Col. 13, Line 44, Line 3 of claim 31 should recite "said determining, selecting and transmitting"

Signed and Sealed this
Fourth Day of December, 2012

David J. Kappos
*Director of the United States Patent and Trademark Office*